United States Patent [19]

Malanowski

[11] Patent Number: 5,687,553

[45] Date of Patent: Nov. 18, 1997

[54] PACKAGING MACHINE WITH RETRACTABLE BED PLATES

[75] Inventor: Don B. Malanowski, Marietta, Ga.

[73] Assignee: Riverwood International Corporation, Atlanta, Ga.

[21] Appl. No.: 661,131

[22] Filed: Jun. 10, 1996

[51] Int. Cl.[6] .............................. B65B 59/00; B65B 43/52
[52] U.S. Cl. .............................. 53/504; 53/201; 53/249; 493/478
[58] Field of Search .............................. 53/249, 250, 201, 53/504, 66, 64, 168, 257, 473; 198/836.3, 861.1, 615; 493/479, 478, 477

[56] References Cited

U.S. PATENT DOCUMENTS

| | | | |
|---|---|---|---|
| 3,325,977 | 6/1967 | Kirsten | 53/201 X |
| 5,241,806 | 9/1993 | Ziegler et al. | 53/257 X |
| 5,517,798 | 5/1996 | Klopfenstein | 53/249 |
| 5,531,056 | 7/1996 | Liang | 493/478 X |
| 5,546,734 | 8/1996 | Moncrief et al. | 53/534 |
| 5,553,441 | 9/1996 | Ivansco, Jr. et al. | 53/249 |

*Primary Examiner*—James F. Coan
*Attorney, Agent, or Firm*—Isaf, Vaughan & Kerr

[57] ABSTRACT

An article packaging machine (11) for packaging articles such as bottles and cans in cardboard containers comprises a carton path along which cartons are moved to be loaded with articles. The carton path is adjustable in width to provide for use of the packaging machine with cartons of various sizes. A series of automatic retractable bed plate assemblies (26), (27), (28), (29) are provided on the machine for underlying and providing support to cartons moving along the carton path. The bed plates are pneumatically actuated and are adapted to be raised automatically into the carton path as the carton path is widened to provide progressively increasing support. Conversely, the bed plates are lowered automatically out of the carton path as the carton path is narrowed to accommodate the narrowing of the path.

20 Claims, 6 Drawing Sheets

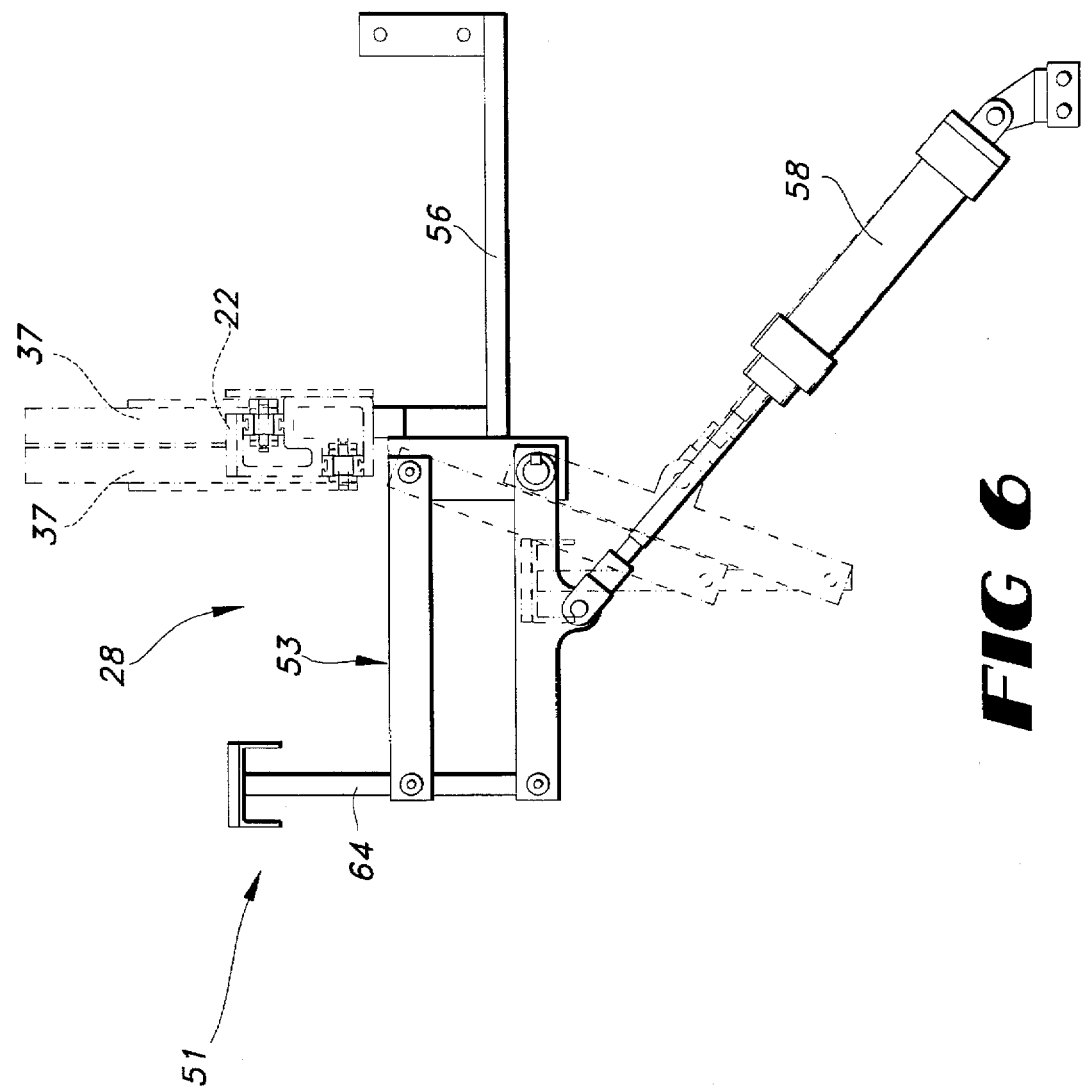

PACKAGING MACHINE WITH RETRACTABLE BED PLATES

FIELD OF THE INVENTION

The present invention relates generally to packaging machines for grouping articles into groups of a predetermined number and directing the groups toward and into open containers such as preformed paperboard cartons moving along a carton path. More particularly, the invention concerns the bed plates of such packaging machines that underlie and support containers as they are moved along the carton path.

BACKGROUND OF THE INVENTION

Various types of packaging machines or cartoning apparatus are designed to package articles, such as bottles or cans, into a unitary container such as a preformed paperboard carton. Although the ultimate intended goal of these types of packaging machines is the same, that is to package a desired number of articles in a specific orientation, the methods and apparatus for accomplishing this goal are diverse. Typically, the articles are grouped in some manner to correspond with the approximate container dimensions, and the article group is then transferred into the container. As a final processing step, the container is closed around the article group. Such containers either can be substantially flat, creased carton blanks that are folded around the article group, or partially formed, open-ended containers into which the articles are directed through one open end. The container ends are then closed by folding flaps across the open ends and gluing the flaps together. An example of such a packaging machine is disclosed in our pending U.S. patent application Ser. No. 08/118,111, and from which the specification is hereby incorporated by reference.

In many modern packaging machines, open cartons are conveyed along a carton path by pairs of upstanding pusher lugs connected to the upper flights of spaced apart endless conveyor chains. The lugs typically extend upwardly between successive cartons on the carton path and are moved along by the endless chain conveyors to push the cartons along the path. As the cartons are conveyed along the carton path, randomly ordered articles are formed into groups by an adjacent infeed conveyor assembly and the grouped articles are then moved progressively toward and into the open cartons moving along the carton path. As each carton is filled, its open end is shut and glued together, whereupon the filled carton is discharged from the carton path at the discharge end of the packaging machine.

In such packaging machines, it is common for the carton path to be adjustable in width to accommodate cartons of different sizes. In the packaging machine disclosed in co-pending application Ser. No. 08/118,111, for example, the carton path is defined on one side by a first pusher lug guide rail and on the other side by a second pusher lug guide rail that extends parallel to the first. Cartons rest at their opposed ends on the guide rails. The pairs of upstanding pusher lugs are supported on and ride along the guide rails for pushing cartons along the carton path. The first guide rail in this example is fixed and the second guide rail is attached to a laterally adjustable accessory rail. The accessory rail supports the second pusher lug guide rail and various other functional components of the packaging machine. In this way, the lateral position of all of the components attached to the accessory rail can be adjusted simultaneously with the accessory rail to accommodate different size cartons.

The accessory rail is selectively movable toward and away from the fixed pusher lug guide rail for adjusting the width of the canon path. As the accessory rail is adjusted away from the fixed guide rail to widen the path, a progressively widening gap is defined between the first and second pusher lug guide rails. Since cartons span this gap as they move along the canon path and are packaged with groups of articles, support must be provided in the gap so that the cartons do not sag and become distorted causing a machine jam during the packaging process. In the past, such support has sometimes been provided by a series of manually insertable elongated bed rails or bed plates that could be positioned within the gap by hand prior to the packaging operation. For larger cartons necessitating a wider carton path, two or more such plates could be installed in the gap for adequate support. Conversely, when it became necessary to reduce the width of the carton path to accommodate a smaller carton, one or more bed plates could be removed manually from the gap as necessary to accommodate a narrower carton path.

While such manually insertable bed plates indeed provide support for cartons moving along the path, they are nevertheless plagued with problems and shortcomings inherent in their design and operation. Primary among these shortcomings is the fact that the bed plates, to be installed, must be inserted manually by an operator prior to the beginning of each new packaging operation. This requires the time and resources of a trained operator and results in additional downtime for the machine, which can be expensive. In addition, the individual bed plates must be provided a storage location near the machine and are subject to being lost, misplaced, or damaged. Finally, since human intervention is required to install and remove the bed plates manually, human error can occur and the bed plates can be forgotten. In these instances, cartons moving along the carton path may not be sufficiently supported and machine jams that can require substantial downtime can occur. Alternatively, if the operator forgets to remove the bed plates while narrowing the carton path, severe damage to the machine will occur.

It can thus be seen that there exists a need in article packaging machines with variable width carton paths for an improved method and apparatus for providing support for cartons that move along the path. Such a method and apparatus should be fully automatic and should require no human intervention. In addition, progressively increasing support should be provided as the carton path widens to accommodate larger cartons. Conversely, support should be progressively and automatically removed from the path as it is narrowed to accommodate smaller cartons. It is to the provision of such a method and apparatus that the present invention is primarily directed.

SUMMARY OF THE INVENTION

Briefly described, the present invention, in one preferred embodiment thereof, comprises an article packaging machine for packaging articles such as bottles or cans into cardboard containers. The packaging machine comprises a frame for supporting the elements of the machine and a carton conveyor mounted to the frame for conveying cartons sequentially along a predetermined carton path for receiving article groups to be packaged. An infeed conveyor assembly is positioned adjacent along one side of the carton path for conveying articles along prescribed paths and directing the articles in groups toward open cartons moving along the carton path. The carton path, itself, is defined by a pair of spaced parallel pusher lug guide rails on which opposed ends of the cartons rest and ride as the cartons move along the carton path. Upstanding pusher lugs are supported on and ride along the rails and are conveyed by endless conveyor chains for pushing cartons sequentially along the carton path. As the cartons move along the path with their ends resting on the guide rails, the midportions or bodies of the cartons span the gap between the rails.

The pusher lug guide rail adjacent the infeed conveyor assembly is fixed. The other pusher lug guide rail is mounted to a laterally adjustable accessory rail, which extends along and beside the carton path. The accessory rail is selectively movable toward and away from the fixed pusher lug guide rail to define carton paths of different widths for accommodating cartons of different sizes. The gap defined between the pusher lug guide rails thus varies with the width of the carton path as the accessory rail is moved toward or away from the fixed guide rail.

At least one bed plate assembly is mounted to a bracket that, in turn, is fixed to the accessory rail below the level of the carton path. The bed plate assembly comprises at least one elongated bed plate having an upper surface that is smooth for slidably supporting cartons moving along the carton path. The bed plate is mounted to its bracket on a pair of pantagraph arms and a pneumatic cylinder is coupled between the bracket and one of the arms. With this configuration, the bed plate can be selectively raised and lowered by appropriately actuating the pneumatic cylinder to swing the bed plate down on its pantagraph arms out of the carton path or to swing it up on its pantagraph arms into the carton path to support cartons moving therealong. In one embodiment, a plurality of such bed plates are mounted to the bracket below the carton path in closely spaced parallel side-by-side relationship.

To actuate the pneumatic cylinders for proper operation of the bed plate assemblies, an array of pneumatic switches is provided, one switch for each of the pneumatic cylinders. The switches are secured to the frame of the packaging machine and are thus fixed relative to the accessory rail. A switch plate is mounted to the bracket that supports the bed plate assembly. As the accessory rail moves away from the fixed pusher lug guide rail, thus widening the carton path and the gap between the pusher lug guide rails, the switch plate moves with the accessory rail. The switch plate is positioned and oriented so that, as it moves, it engages and actuates the pneumatic switches sequentially to raise the spaced parallel bed plates one after another into the widening gap. Thus, progressively increasing support is provided in the widening gap. Conversely, as the accessory rail moves toward the fixed guide rail narrowing the gap, corresponding movement of the switch plate again actuates the pneumatic switches sequentially, which lowers the bed plates out of the gap, one at a time. Thus, as the gap narrows, the bed plates are sequentially lowered out of the canon path.

In one embodiment, the individual bed plates are mounted on pantagraph arms that extend generally longitudinally with respect to the bed plate. In another embodiment, and at another location on the packaging machine, the bed plate is mounted on pantagraph arms that extend generally transversely with respect to the bed plate. With either configuration, the rails are raised and lowered automatically as the accessory rail moves to adjust the carton path width so that automatic and appropriate support for cartons moving along the carton path is provided.

Thus, an improved article packaging machine is now provided wherein increasing support for cartons moving along the carton path is provided automatically as the carton path is widened. This is accomplished through sequential movement of elongated bed plates into the gap between the two pusher lug guide rails as the carton path is widened. When the carton path is narrowed, the bed plates are lowered sequentially out of the carton path and stowed in an out-of-the-way location below the path. The automatic bed plate assemblies of the present invention eliminate the need for manual set up of the bed plates when adjusting the width of the carton path, and eliminate the attendant need for a trained technician to insert or remove the bed plates manually. Further, machine downtime is greatly reduced since the bed plates are inserted into the carton path automatically as the carton path is widened and removed automatically as the path is narrowed. These and other objects, features, and advantages of the invention will become more apparent upon review of the detailed description set forth below, taken in conjunction with the accompanying drawings, which are briefly described as follows.

BRIEF DESCRIPTION OF THE DRAWINGS

FIG. 6 is an end elevational view taken along line 5—5 of FIG. 2 illustrating an automatic bed plate at a different location of the machine mounted on transverse pantagraph arms.

DETAILED DESCRIPTION OF THE PREFERRED EMBODIMENT

Figure 1:
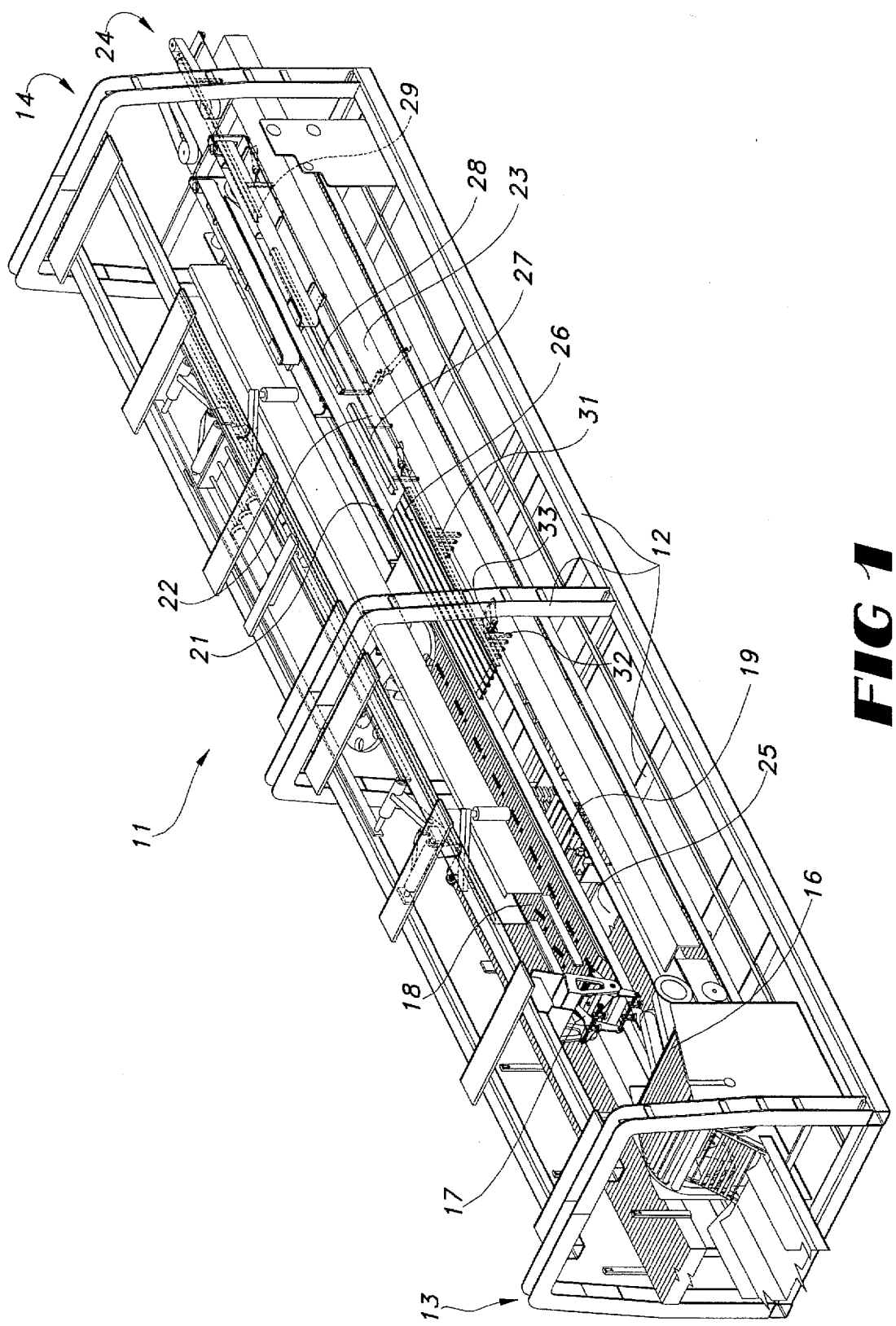
FIG. 1 is a perspective view of an article packaging machine that embodies principals of the present invention in a preferred form. Elements of the machine most pertinent to the present invention are shown in solid line, while other elements are shown in phantom line for clarity.

Referring now in more detail to the drawings, in which like numerals refer to like parts throughout the several views, FIG. 1 illustrates in perspective form an article packaging machine that embodies principals of the invention in a preferred form. The packaging machine 11 has a walk-in frame 12 that supports the various functional elements of the machine and that provides overhead structure for supporting a retractable enclosure (not shown). The machine 11 has an infeed end 13 and a discharge end 14. A carton magazine assembly 16 is mounted to the frame at the infeed end thereof. The assembly 16 functions to feed cardboard containers or cartons successively to the machine for subsequent packaging with articles. Typically, the cartons or containers are fed by the carton magazine assembly 16 in a flattened or unopened configuration. A carton opening station 17 has a carton feed opening wheel with at least one suction cup thereon that engages the flattened cartons and pulls them open for delivery to the carton path of the machine, where the cartons are conveyed along the machine for packaging and closing.

An elongated carton path, i.e., a carton transport conveyor, which extends from the carton opening station 17 to the discharge end 14 of the machine, is defined by a first elongated pusher lug guide rail 21 and, spaced therefrom, a second pusher lug guide rail 22. As described in more detail below, the pusher lug guide rails 21 and 22 are located along and define the edges of the carton path. The guide rails support spaced upstanding pairs of pusher lugs that are moved along the rails by respective endless conveyor chains. When moving along the carton path, one edge of each carton rests upon the guide rail 21, the opposite edge of the carton rests on the guide rail 22, and the body of the carton extends across and spans the space between the guide rails. As the pusher lugs move along the guide rails, they engage the cartons adjacent their opposed ends and push them successively along the rails and along the carton path to the right in FIG. 1.

The first pusher lug guide rail 21 is mounted to the frame 12 and is fixed. A selector belt conveyor assembly 18 is mounted to the frame adjacent to first pusher lug guide rail 21 and is driven to move along and beside, rail 21 to the right in FIG. 1. The conveyor assembly 18 includes a spaced series of selector wedges (not illustrated) and other functional elements that group articles into groups of a predetermined size and direct the article groups toward and into open cartons moving along the adjacent carton path. The configuration and function of these selector wedges in conjunction with the conveyor assembly 18 is described in detail in co-pending application Ser. No. 08/118,111, and that description is hereby incorporated by reference. Unused selector wedges 19 are stowed in an out-of-the-way location in the machine so that appropriate selector wedges can be selected and installed for grouping articles into groups of various desired number and size.

An accessory rail 23 is mounted to frame 12 and extends therealong beside the carton path on the opposite side from the selector belt conveyor assembly as shown. The accessory rail provides a mounting structure to which various functional elements of the machine are mounted. In this regard, the second pusher lug guide rail 22 is mounted to the accessory rail 23 and is held by the accessory rail in spaced parallel relationship relative to the first pusher lug guide rail 21.

The accessory rail 23 is mounted to the frame 12 for selective movement in a transverse direction relative to the carton path. As the accessory rail 23 is adjusted or moved in such transverse direction, all of the functional elements mounted to the rail are moved along with the rail. Thus, adjustment of the transverse position of accessory rail 23 causes the second pusher lug guide rail 22 to move toward or away from the first pusher lug guide rail 21. This functions to adjust the width of the carton path so that the machine can accommodate cartons of different sizes. For example, for six-pack cartons that are to be loaded with six beverage cans, the accessory rail 23 would be adjusted toward the pusher lug guide rail 21 so that opposed edges of the relatively shorter six-pack cartons rest and ride along the guide rails 21 and 22. Conversely, the accessory rail 23 can be adjusted away from the first pusher lug guide rail 21 to provide a wider carton path for accommodating relatively longer twelve or twenty-four pack cartons with the opposed edges of these cartons also resting on and riding along the guide rails 21 and 22. With substantially all of the functional elements of the machine requiring adjustment for different sized cartons being mounted to the accessory rail 23, it will be seen that the machine can quickly be adjusted to accommodate cartons of different sizes by appropriate lateral movement and adjustment of the accessory rail 23.

The pusher lug guide rails 21 and 22 define the width of the carton path and a space or gap 25 is defined between the rails. As mentioned above, when cartons move along the path, there opposed edges rest on the spaced guide rails 21 and 22 and the midsections or bodies of the cartons extend across and span the gap 25 between the rails. As the cartons are loaded with articles, the weight of the articles tends to cause the cartons to sag in the gap 25. To prevent such sagging and to provide support for the loaded cartons within the gap, a series of retractable bed plate assemblies are provided along the carton path. These assemblies will be described in detail hereinafter. However, in FIG. 1, the first retractable bed plate assembly 26 comprises a group of side-by-side elongated bed plates that are mounted to a bracket on respective pairs of pantagraph arms 31 and 32. The bracket, in turn, is mounted to the accessory rail. With this arrangement, each of the bed plates can be lowered on its pantagraph arms to a position below the carton path or raised on its pantagraph arms as depicted in FIG. 1 to a position substantially in the plane of the pusher lug support rails 21 and 22 and thus in the carton path. In their raised positions, the bed plates provide support in the gap between the pusher lug guide rails.

A pneumatic cylinder 33 (FIG. 3) is coupled to one of the pantagraph arms of each bed plate assembly. Appropriate actuation of the pneumatic cylinder 33 extends the cylinder and pushes the pantagraph arm 32 to the left in FIG. 1. This, in turn, lowers the respective bed plate on its pantagraph arm to its stowed or out-of-the-way position below the carton path.

Similarly, second, third, and fourth bed plate assemblies 27, 28, and 29 are mounted to the accessory rail assembly 23. These bed plate assemblies are also mounted on respective pantagraph arms and are provided with pneumatic cylinders for raising the individual bed plates into the carton path to provide carton support, and for lowering the bed plates below the path in a stored out-of-the-way location. The bed plate assemblies 26, 27, 28, and 29 are located at strategic positions along the carton path to provide appropriate support for cartons moving along the path and spanning the gap thereof as the cartons are pushed along the carton path, packaged, and sealed shut.

Figure 2:
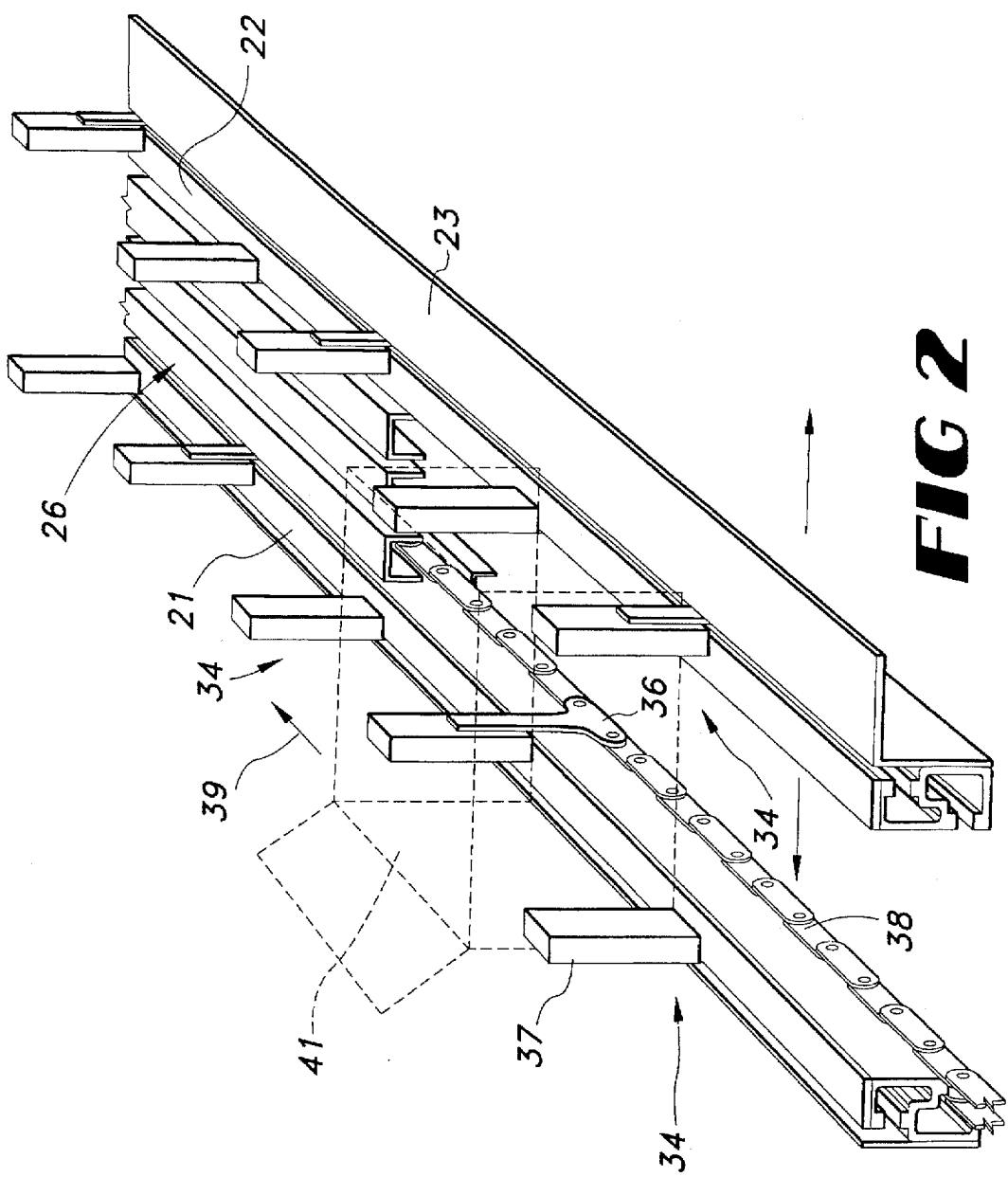
FIG. 2 is a perspective view along the carton path of the packaging machine of FIG. 1.

FIG. 2 is a perspective view along the carton path of the article packaging machine 11 shown in FIG. 1. As previously discussed, the carton path is defined by a pair of spaced pusher lug guide rails 21 and 22. Each of the guide rails 21 and 22 supports a plurality of upstanding pusher lug assemblies 34. Each assembly 34 comprises a bracket 36 that secures a pusher lug 37. The bracket 36 is mounted at its bottom end to an endless conveyor chain 38 that is driven to move along the carton path in the direction indicated by arrow 39. This is the downstream direction of the machine; that is, a direction from the infeed end 13 of the machine to the discharge end 14 thereof.

Each pusher lug 37 is substantially rectangular in shape in the preferred embodiment and its bottom edge rests on and rides along a respective one of the pusher lug guide rails. With this configuration, the pusher lugs move along in spaced pairs on each of the pusher lug guide rails in the downstream direction of the machine. In use, cartons or containers 41 (shown in phantom lines in FIG. 2) rest at their opposed ends on the pusher lug guide rails and are pushed along the carton path by the moving upstanding pusher lugs 37. As the cartons are pushed along the carton path, articles to be packaged, such as beverage cans, are moved toward and into the open ends of the cartons by the selector belt conveyor assembly and its associated selector wedge arrangements.

When cartons 41 are moved along the carton path, their ends rest on and ride along the two spaced pusher lug guide rails 21 and 22 with the main bodies of the cartons spanning the space between the rails. At approximately the position along the carton path where articles are loaded into the open cartons, elongated bed plates of the bed plate assembly 26 are positioned in the gap between the pusher lug guide rails and are located so that the cartons 41 rest upon and are supported by the bed plates in the gap. In FIG. 2, three side-by-side elongated plates are shown in their raised position located in the gap for supporting cartons. One of the bed plates in the army is shown in its lowered positions beneath the carton path and out of the way. Additional bed plate assemblies are positioned further along the path for continued support of the cartons as they are processed while being moved along the carton path.

Figure 3:
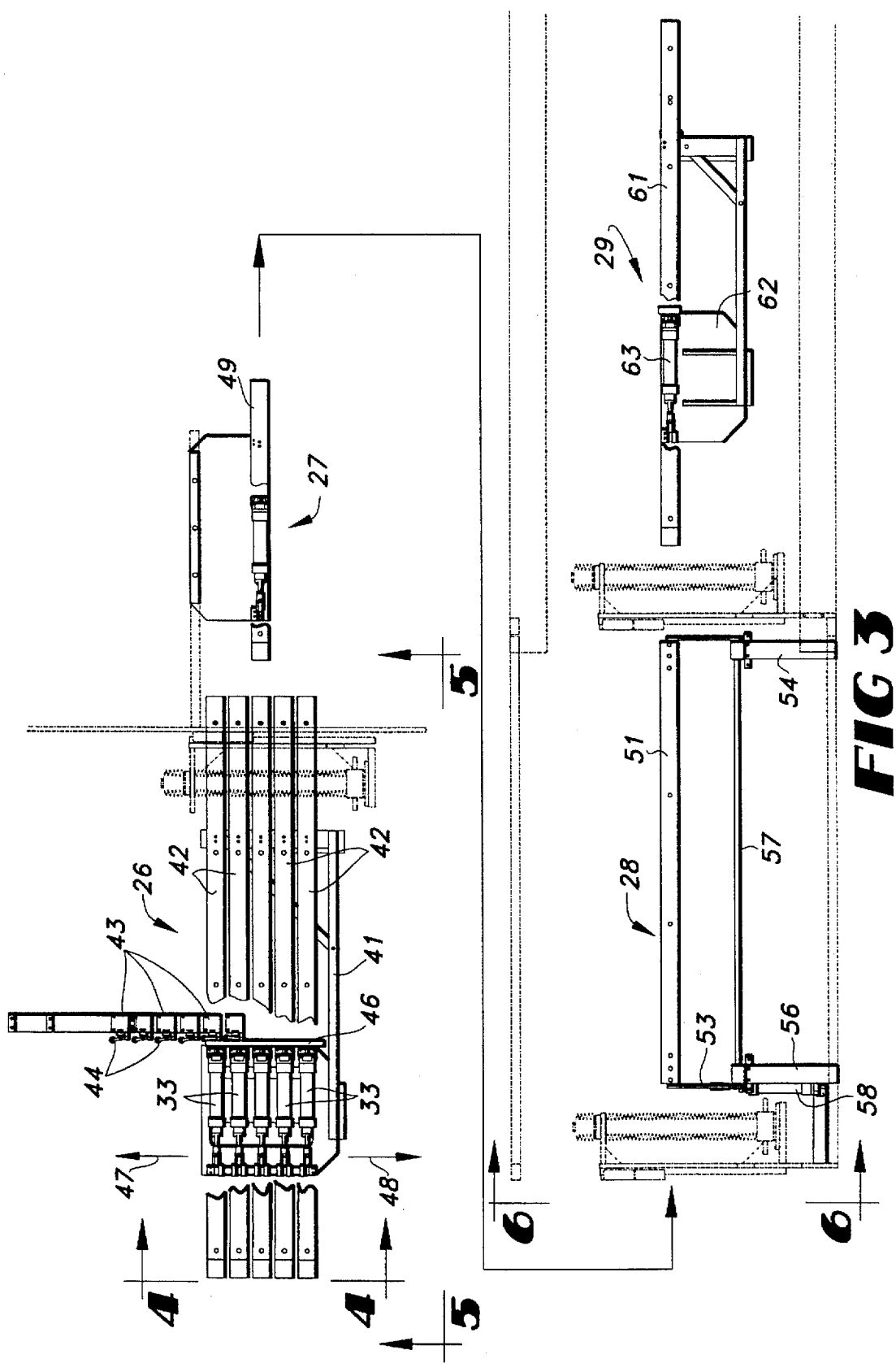
FIG. 3 is a top plan view showing the automatic bed plate system and its arrangement along the length of the cannon path in the article packaging machine.

FIG. 3 is a top plan view with partially cut away sections illustrating the various retractable bed plate assemblies of the preferred embodiment. Illustrated are the first bed plate assembly 26, the second bed plate assembly 27, the third bed plate assembly 28, and the fourth bed plate assembly 29. These bed plate assemblies are arranged progressively along the carton path to provide substantially continuous support for cartons moving along the path as the cartons traverse the various packaging sections of the machine.

The first bed plate assembly 26 is mounted on a bracket 41 (FIG. 4), which, in turn, is mounted to the laterally adjustable accessory rail of the packaging machine. With this configuration, the entire bed plate assembly 26 moves laterally in unison with the accessory rail as the accessory rail is adjusted. The assembly 26 comprises a plurality of individual elongated bed plates 42 arranged in parallel side-by-side relationship, as illustrated, for providing carton stability as the carton moving thereon is supplied with the articles being packaged therein. Preferably, each of the bed plates 42 has a smooth metal upper surface so that cartons moving along the path and resting upon the bed plates can slide with reduced friction along the plates.

Each of the individual bed plates is mounted on a pair of pantagraph arms so that each bed plate can be swung on its pantagraph arms from a raised position where the arms extend vertically and the bed plate is positioned in the carton path for supporting cartons, to a lowered or stowed position wherein the bed plate is located out-of-the-way below the carton path. The raised position of the bed plates is illustrated in solid lines in FIG. 5, while a lowered position is illustrated in phantom lines.

Referring again to FIG. 3, each one of a set of pneumatic cylinders 33 is coupled between the bracket 41 and one of the pantagraph arms of a respective bed plate. The cylinders are retractable and extendable to raise and lower their respective bed plates by application of appropriate pneumatic pressure to the pneumatic cylinders. To provide such pneumatic pressure, an array of pneumatic switches 43 are mounted to the frame of the packaging machine. Each of the switches 43 is coupled to a respective one of the pneumatic cylinders 33 to provide appropriate pneumatic pressure to extend and retract its respective pneumatic cylinder 33. Each of the pneumatic switches 43 is provided with a lever 44 that, when depressed, causes the pneumatic switch to extend its respective pneumatic cylinder, and when released, causes the pneumatic switch to retract its cylinder.

A switch plate 46 is secured to the bracket on which the pneumatic cylinders 33 are mounted and extends upwardly therefrom; i.e., out of the page in FIG. 2. The switch plate 46 is positioned and arranged so that as the accessory rail and thus the bed plate assembly 26 moves laterally in the directions indicated by arrows 47, the switch plate progressively engages the levers of the army of pneumatic switches 43. Specifically, as the bed plate assembly moves in the direction 47 along with adjustment of the accessory rail, the switch plate 46 progressively engages the levers to depress them. Conversely, as the bed rail assembly 26 moves in the direction of arrow 48 along with the accessory rail, the levers are progressively released as the switch plate moves past each of the successive pneumatic switches.

In the preferred embodiment, the top pneumatic switch in FIG. 3 is coupled to the bottom bed plate 42 and successive pneumatic switches are coupled to respective successive bed plates 42. With this arrangement, it will be seen that, as the accessory rail is adjusted to widen the carton path causing the bed plate assembly 26 to move in direction 48, the pneumatic switches 43 are successively released, which causes the individual bed plates to be successively raised. Thus, as the gap between the pusher lug guide rails widens, successive individual bed plates 42 are raised into position, one at a time, to fill in the widening gap. Conversely, as the accessory rail is adjusted to reduce the width of the gap, successive ones of the pneumatic switches 43 are engaged by the switch plate to depress their levers thus lowering, one at a time, the individual bed plates 42 out of the gap to accommodate the narrowing carton path. Thus, successively increasing support in the gap between the pusher lug guide rails is provided as the carton path is widened to accommodate larger cartons. When the accessory rail is adjusted to narrow the carton path, the bed plates are successively lowered out of the gap to make way for the narrowing carton path. Support is therefore added and removed automatically upon adjustment of the width of the carton path.

The second bed plate assembly 27 functions in a manner similar to that of one of the individual bed plates 42 of the first bed plate assembly 26. At this point along the carton path, only a single support is required in the gap between the pusher lug guide rails. Accordingly, only one individual bed plate 49 and its associated pneumatic cylinder for raising and lowering it is provided. An appropriate pneumatic switch (not shown) is coupled to raise the bed plate 49 when the carton path is widened beyond a predetermined threshold and to lower the bed plate 40 when the path is narrowed beyond the threshold.

The third bed plate assembly 28 is also adapted to raise and lower a single bed plate in and out of the carton path depending upon the width of the path. In the case of this third bed plate assembly, an individual bed plate 51 is mounted on two pairs of pantagraph arms 52 and 53 respectively (see FIG. 6) that extend generally transversely with respect to the bed plate 51. The pantagraph arms 52 and 53 are pivotally coupled to brackets 54 and 56 respectively that, in turn, are coupled to the adjustable accessory rail. A linkage rod 57 is fixed to and extends between corresponding arms of the two pairs of pantagraph arms. In this way, when one pair of arms is raised or lowered, this movement is transferred through the linkage rod 57 to the other pair of arms, which then raise or lower in unison with the first pair.

A pneumatic cylinder 58 is coupled to one of the pairs of pantagraph arms to raise the arms and thus raise the bed plate 51 into the carton path when the pneumatic cylinder 58 is extended. Conversely, retraction of the pneumatic cylinder 58 causes the pantagraph arms and thus the bed plate 51 to lower. An appropriate pneumatic switch (not shown) is adapted to detect when the carton path widens beyond a predetermined threshold and, in response, to extend the pneumatic cylinder 58 to raise the bed plate 51. Thus, again, as the carton path widens, the bed plate 51 is raised into position to support cartons moving along the path, and as the path narrows, the bed plate 51 is lowered moving it out of the way to make room for the narrowing path. The raised position of the assembly 28 is shown in solid lines in FIG. 5, while its lowered position is shown in phantom lines.

Finally, FIG. 3 also illustrates the fourth retractable bed plate assembly 29 that is located downstream in the carton path from the first three assemblies. The assembly 29 is constructed and functions in a manner similar to each of the individual bed plates 42 in assembly 26. Specifically, the assembly 29 includes a single bed plate 61 that is mounted on a pair of pantagraph arms so that the plate can be raised and lowered by appropriate manipulation of the arms. The assembly 29 is mounted on a bracket 62 that, in turn, is mounted to and moves with the adjustable accessory rail on the packaging machine. A pneumatic cylinder 63 is coupled to one of the pantagraph arms of the assembly so that when the cylinder is extended, the bed plate 61 is lowered and when the cylinder is retracted, the bed plate 61 is raised into position to support cartons on the path.

An appropriate pneumatic switch (not shown) is adapted to retract the pneumatic cylinder and raise the bed plate 61 when the carton path is widened beyond the predetermined threshold and, conversely, to extend the pneumatic cylinder 63 and lower the bed plate 61 when the carton path is narrowed beyond the threshold. Thus, as with the other bed plate assemblies, the bed plate 61 is raised into position when necessary to provide support for the midsections of the cartons moving along the carton path.

Figure 4:
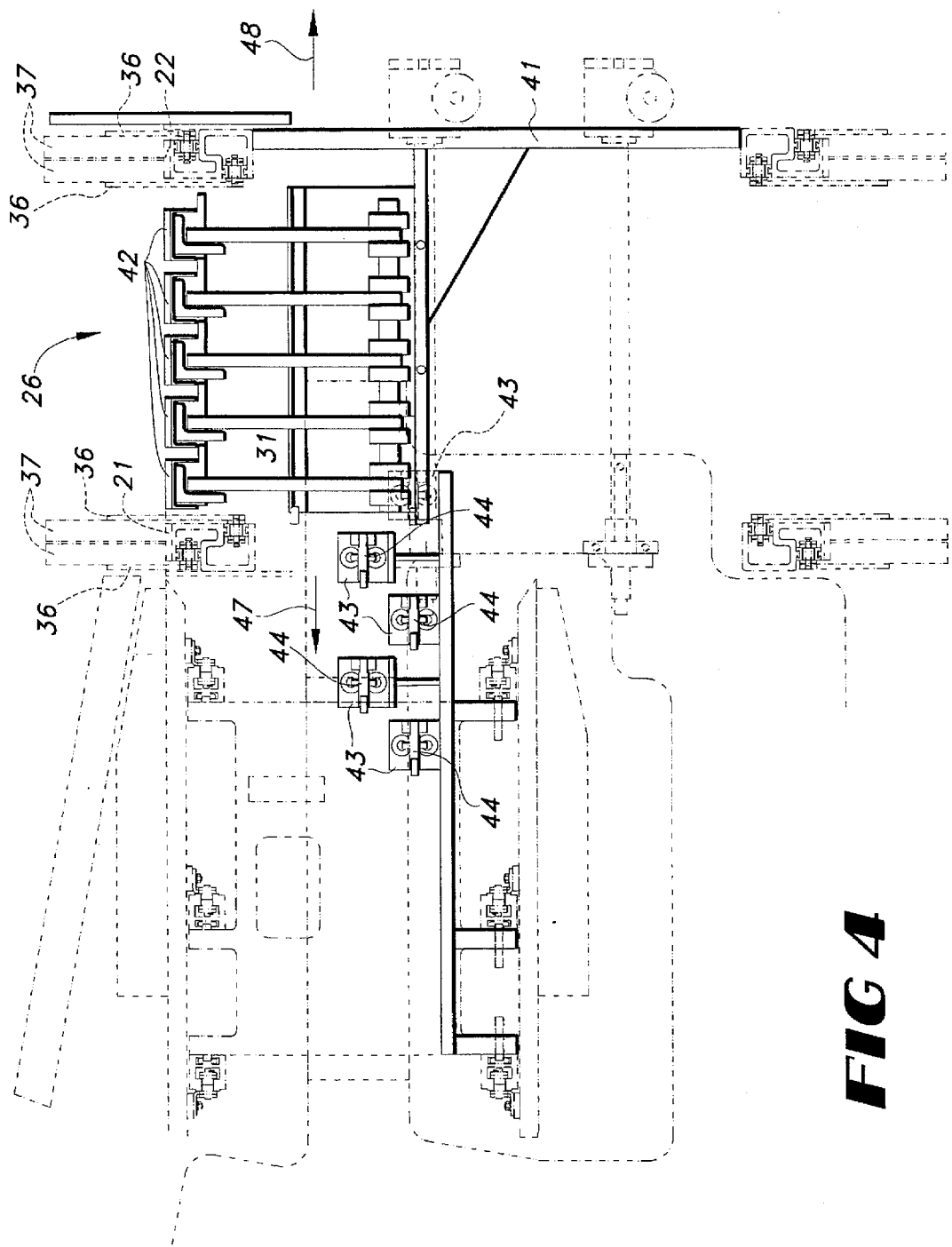
FIG. 4 is an end elevational view taken along line 3—3 of FIG. 1 illustrating the multiple side-by-side automatic bed plate assemblies.

FIG. 4 is an end elevational view of the bed plate assembly 26 showing, from another perspective, the construction and operation thereof. In this perspective, the first pusher lug guide rail 21 and the second pusher lug guide rail 22 are seen in their spaced parallel relationships defining the width of the carton path. Pusher lug brackets 36 support pusher lugs 37, which rest on and ride along the pusher lug guide rails 21 and 22. Individual bed plates 42 are seen mounted on pantagraph arms 31 to bracket 41 that, in turn, is mounted to the adjustable accessory rail. Thus, the bracket 41 and entire assembly 26 is moved in the directions indicated by arrows 47 and 48 along with lateral adjustment of the accessory rail.

A switch plate 46 is mounted to the bracket 41 and extends upwardly therefrom. The switch plate is positioned and oriented to engage the levers 44 of pneumatic switches 43 as the plate moves along with the accessory rail. In FIG. 4 the carton path is seen in a widened state so that all of the bed plates 42 are in their raised positions located in the gap between support rails 21 and 22 to provide support for cartons moving along the carton path.

Assuming, with continuing reference to FIG. 4, that the accessory rail is in the process of being adjusted to the left in direction 47, it is seen that the switch plate 46 has just engaged the lever 44 of the right most pneumatic switch 43. This switch is coupled to the pneumatic cylinder of the left most bed plate 42. As the lever 44 is depressed by the switch plate 46, the pneumatic switch is actuated to extend the pneumatic cylinder thus swinging the pantagraph arm down and lowering the left most bed plate out of the way to accommodate the continued narrowing of the carton path. As the path continues to narrow, the switch plate eventually depresses lever 44 of the second pneumatic switch on the right in FIG. 3, thus lowering the second bed plate 42 from the left in FIG. 3. This process continues with bed plates successively being lowered from the left as the carton path is narrowed to accommodate the narrowing path.

When the carton path is widened, the switch plate 46 progressively passes beyond the pneumatic switches 43, thus disengaging the levers and raising the bed plates 42 progressively into place to provide progressively increasing support in the widening carton path.

Figure 5:
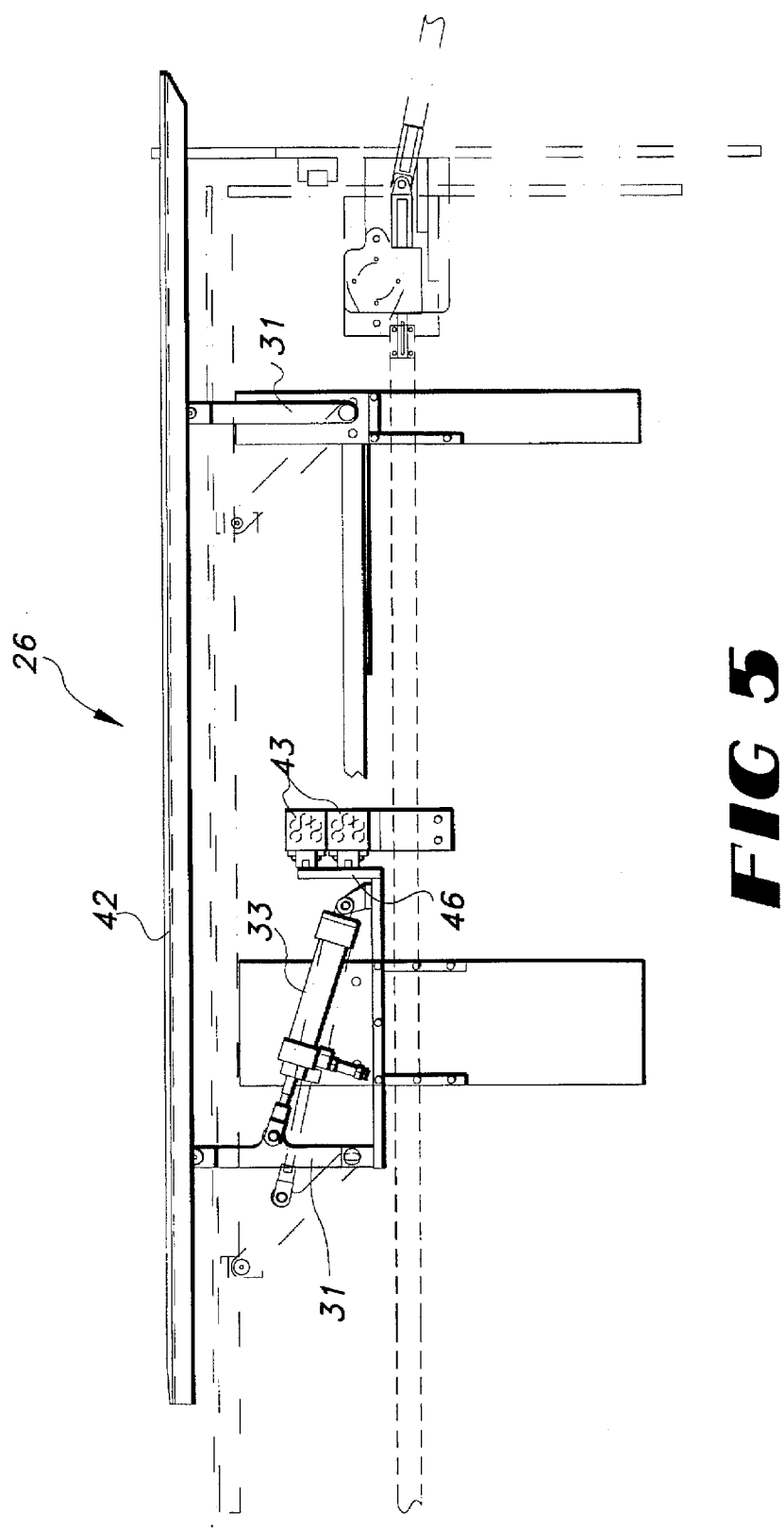
FIG. 5 is a side elevational view taken along line 4—4 of FIG. 1 illustrating the raising and lowering of the bed plate assemblies on pantagraph arms.

FIG. 5 is a side elevational view of the first bed plate assembly 26 illustrating from a different perspective the construction and function thereof. In FIG. 5, the switch plate 46 is seen positioned to engage and depress successive levers 44 of pneumatic switches 43 to raise and lower bed plates 42 as required to provide support along the carton path. The raised position of bed plate 42 wherein the pantagraph arms 31 extend vertically is shown in solid lines in FIG. 5, while the lowered position of the bed plate is shown in phantom lines in FIG. 5.

FIG. 6 illustrates in an end elevational view the construction and function of the third bed plate assembly 28. Again, the pusher lug guide rail 22 is shown supporting pusher lugs 37. The bed plate 51 in this configuration is mounted on vertical arms 64 that, in turn, are mounted on pairs of pantagraph arms 53 to bracket 56. The bracket 56 is, in turn, secured to the adjustable accessory rail so that the entire assembly moves laterally with the accessory rail. A pneumatic cylinder 58 is coupled to one of the pantagraph arms 53 to raise the bed plate 51 to its support position upon extension of the cylinder, as shown in solid lines in FIG. 6, and to lower to the bed plate 51 to its stowed position upon retraction of the cylinder, as shown in phantom lines in FIG. 6. An appropriate pneumatic switch (not shown) is coupled to detect widening of the carton path beyond a predetermined threshold and, in response to such detection, to cause the pneumatic cylinder 58 to extend, thus raising the bed plate 51 into its support position. Thus, as with the other bed plate assemblies, support is provided by the bed plate 51 automatically and when necessary.

The invention has been described herein in terms of preferred embodiments and methodologies. It will be understood by those of skill in this art, however, that various modifications might well be made to the illustrated embodiments within the scope of the invention. For example, the particular placement and arrangement of the pneumatic switches and their activation by the moving switch plate is preferred. However, any means of activating the pneumatic cylinders at the appropriate times to raise and lower the respective bed plates is contemplated by this invention. Further, while individual bed plates in the preferred embodiment are shown mounted on pantagraph arms for articulated movement, other means for mounting the plates might also be used. For instance, a pair of spaced vertically extending pneumatic cylinders could be coupled directly to each of the bed plates for raising and lowering the bed plates vertically upon appropriate actuation of the pneumatic cylinders. Also, the bed plates of the preferred embodiment are mounted to move laterally with the accessory rail. While this arrangement is preferred, the bed plate assemblies might also be mounted to the frame of the machine with appropriate modifications. These and other additions, deletions, and modifications might well be made to the preferred embodiments illustrated herein without departing from the spirit and scope of the invention as set forth in the claims.

I claim:

1. An article packaging machine for packaging articles such as bottles or cans into preformed cartons, said packaging machine comprising:

a frame;

carton conveyor means mounted to said frame for conveying the cartons along a predetermined carton path;

a first guide rail on one side of said carton path for supporting one end of the cartons as they are conveyed along said carton path;

a second guide rail on the opposite side of said carton path for supporting the opposite ends of the cartons as they are conveyed along said carton path, said second guide rail being selectively movable toward and away from said first guide rail to define carton paths of different widths for accommodating cartons of different sizes, said first and said second guide rails defining a gap therebetween;

at least one bed plate mounted for selective movement between a first position wherein said bed plate is located in said gap for underlying and supporting the cartons moving along said carton path and a second position displaced from said gap;

motive means for moving said bed plate between said first and second positions in response to appropriate control signals;

switch means coupled to said motive means for producing a first control signal to cause said motive means to move said bed plate to its first position, and for producing a second control signal to cause said motive means to move said bed plate to its said second position; and means for actuating said switch means to produce said first control signal when said gap widens beyond a predetermined threshold and for actuating said switch means to produce said second control signal when said gap narrows beyond a predetermined threshold.

2. An article packaging machine as claimed in claim 1 and wherein said bed plate is an elongated rail having an upper surface for supporting the cartons moving along said carton path when said bed plate is in its first position.

3. An article packaging machine as claimed in claim 1 and wherein said second position is a lowered position relative to said gap and said carton path.

4. An article packaging machine as claimed in claim 3 and wherein said bed plate is mounted on a pair of pantagraph arms for movement between said first and second positions.

5. An article packaging machine as claimed in claim 4 and wherein said motive means comprises an extendable and retractable pneumatic cylinder coupled to one of said pantagraph arms.

6. An article packaging machine as claimed in claim 5 and wherein said pneumatic cylinder is oriented to move said bed plate to its first position upon retraction of said pneumatic cylinder and to move said bed plate to its second position upon extension of said pneumatic cylinder.

7. An article packaging machine as claimed in claim 1 and wherein said motive means comprises an extendable and retractable pneumatic cylinder.

8. An article packaging machine as claimed in claim 7 and wherein said switch means comprises a pneumatic switch operatively coupled to said pneumatic cylinder.

9. An article packaging machine as claimed in claim 1 and further comprising additional bed plates mounted for selective movement between respective first positions wherein said bed plates are located side-by-side in said gap for supporting cartons moving along said carton path and second positions wherein said bed plates are displaced from said gap, and means for successively raising said bed plates as said gap widens to provide progressively more support surface within said gap and for successively displacing said bed plates from said gap as said gap narrows.

10. In an article packaging machine having a frame, carton conveyor means mounted to the frame for conveying preformed cartons along a predetermined carton path, a first guide rail on one side of the carton path for supporting one end of the cartons moving along the carton path, a second guide rail on the opposite side of the carton path for supporting the opposite ends of the cartons moving along the carton path, the second guide rail being selectively movable toward and away from the first guide rail to define carton paths of different widths for accommodating cartons of different sizes, said first and second guide rails defining a gap therebetween with said gap underlying the carton path, the improvement comprising at least one bed plate mounted for selective movement between a first position wherein said bed plate is located in said gap for underlying and supporting cartons moving along the carton path and a second position displaced from said gap, motive means for moving said bed plate between said first and said second positions in response to appropriate control signals, switch means coupled to said motive means for producing a first control signal to cause said motive means to move said bed plate to its first position for supporting cartons and for producing a second control signal to cause said motive means to move said bed plate to its second position out of the gap; and means for actuating said switch means to produce said first control signal when said gap widens beyond a predetermined threshold and for actuating said switch means to produce said second control signal when said gap narrows beyond a predetermined threshold.

11. The improvement of claim 10 and wherein said bed plate is an elongated rail that extends along the carton path within the gap when said bed rail is in its first position.

12. The improvement of claim 11 and wherein said second position of said bed plate is below the gap and wherein said bed plate is mounted on a pair of pantagraph arms for raising and lowering said bed plate.

13. The improvement of claim 12 and wherein said motive means comprises a pneumatic cylinder coupled to one of said pantagraph arms.

14. The improvement of claim 10 and further comprising additional bed plates mounted for selective movement between respective first positions wherein said bed plates are located side-by-side in the gap for supporting cartons moving along the carton path and second positions wherein said bed plates are displaced from the gap, and means for successively raising said bed plates as the gap widens to provide progressively more support surface within the gap and for successively displacing said bed plates from the gap as the gap narrows.

15. A method of providing support for preformed cartons moving along a carton path in an article packaging machine wherein the carton path overlies a gap that can be selectively widened or narrowed to accommodate wider or narrower cartons respectively, said method comprising the steps of:

(a) producing a first control signal indicative of a predetermined threshold width as said gap widens; and (b) moving a bed plate into the gap in response to the control signal to underlie and support cartons moving along the path.

16. The method of claim 15 and further comprising the steps of producing successive first control signals indicative of successive threshold widths of the gap and successively raising additional bed plates into the gap in response to respective successive first control signals to provide progressively more support within the widening gap.

17. The method of claim 15 and further comprising the step of producing a second control signal indicative of a predetermined threshold width as the gap narrows and lowering the bed plate out of the gap in response to the control signal.

18. The method of claim 17 and further comprising the steps of producing successive second control signals indicative of successive threshold widths of the gap and successively lowering additional bed plates out of the gap in response to respective successive second control signals.

19. An article packaging machine having a frame, a carton conveyor for moving preformed cartons along a carton path, an article conveyor on one side of said carton conveyor for progressively directing articles into the cartons moving along said carton path, and an accessory rail on the opposite side of said carton path, said accessory rail being adjustable toward and away from said article conveyor to define a carton path of different widths to accommodate different size cartons, a variable width gap being defined between said article conveyor and said accessory rail, a plurality of elongated side-by-side bed rails movably mounted below said carton path, each of said bed rails being movable between a raised position wherein said bed rail is located in said gap for supporting cartons moving along said carton path and a lowered position out of said carton path, and means for successively raising said bed rails into said gap as said gap is widened to accommodate larger cartons and for progressively lowering said bed rails out of said gap as said gap is narrowed to accommodate smaller cartons.

20. An article packaging machine as claimed in claim 19 wherein said bed rails are each mounted on a pair of pantagraph arms, and wherein said means for successively raising and lowering comprises a plurality of extendable and retractable pneumatic cylinders with each cylinder being operatively coupled to one pantagraph arm of a respective one of said bed rails and detector means for detecting progressive threshold widths of said gap and for producing control signals for successive actuation of said pneumatic cylinders to raise and lower said bed rails as the width of said gap changes.

* * * * *